United States Patent
Tomlin et al.

(10) Patent No.: US 10,799,825 B2
(45) Date of Patent: *Oct. 13, 2020

(54) AIR FILTER ELEMENT ASSEMBLY FOR A MOTOR VEHICLE

(71) Applicant: FORD GLOBAL TECHNOLOGIES, LLC, Dearborn, MI (US)

(72) Inventors: Jacqueline L. Tomlin, Southfield, MI (US); Roger Khami, Troy, MI (US); Alexander King, Farmington Hills, MI (US); Jeff Sean Boulton, Monroe, MI (US); John Emley, Canton, MI (US); Joseph Matthew McCann, Plymouth, MI (US); Hovie Jarrett Cassell, Piedmont, SC (US)

(73) Assignee: Ford Global Technologies, LLC, Dearborn, MI (US)

(*) Notice: Subject to any disclaimer, the term of this patent is extended or adjusted under 35 U.S.C. 154(b) by 0 days.

This patent is subject to a terminal disclaimer.

(21) Appl. No.: 16/288,392

(22) Filed: Feb. 28, 2019

(65) Prior Publication Data
US 2019/0193013 A1 Jun. 27, 2019

Related U.S. Application Data

(63) Continuation of application No. 14/498,507, filed on Sep. 26, 2014, now Pat. No. 10,252,205.

(51) Int. Cl.
*B01D 46/00* (2006.01)
*B01D 46/24* (2006.01)
(Continued)

(52) U.S. Cl.
CPC ....... *B01D 46/0084* (2013.01); *B01D 46/002* (2013.01); *B01D 46/0023* (2013.01);
(Continued)

(58) Field of Classification Search
CPC .............. B01D 46/002; B01D 46/0021; B01D 46/0024; B01D 46/0023; B01D 46/2411; B01D 46/0084; B01D 46/521; B01D 46/0095; B01D 2273/10; B01D 46/0005; B01D 2265/06; F02M 35/0215; F02M 35/02483; F02M 35/088
See application file for complete search history.

(56) References Cited

U.S. PATENT DOCUMENTS 4,861,359 A 8/1989 Tettman
5,266,090 A * 11/1993 Burnett .............. B01D 39/1676
55/333

(Continued)

FOREIGN PATENT DOCUMENTS

DE 102013224878 A1 6/2014

OTHER PUBLICATIONS

English Machine Translation of DE102013224878A1 dated Jun. 5, 2014.

*Primary Examiner* — Robert Clemente
(74) *Attorney, Agent, or Firm* — Geoffrey Brumbaugh; King & Schickli, PLLC (57) ABSTRACT

A filter element assembly includes a filter body and an auxiliary filter. The filter body includes a sidewall around a hollow core. Further the filter body and auxiliary filter are both received and held on a support including a base and a cage.

11 Claims, 7 Drawing Sheets

(51) Int. Cl.
  *B01D 46/52* (2006.01)
  *F02M 35/024* (2006.01)
  *F02M 35/08* (2006.01)
  *F02M 35/02* (2006.01)

(52) U.S. Cl.
  CPC ...... *B01D 46/0095* (2013.01); *B01D 46/2411* (2013.01); *B01D 46/521* (2013.01); *F02M 35/0215* (2013.01); *F02M 35/02483* (2013.01); *F02M 35/088* (2013.01); *B01D 2265/06* (2013.01); *B01D 2273/10* (2013.01); *B01D 2275/208* (2013.01)

(56) References Cited

U.S. PATENT DOCUMENTS

| | | |
|---|---|---|
| 5,391,212 A | 2/1995 | Ernst et al. |
| 5,556,441 A | 9/1996 | Courtwright et al. |
| 5,858,044 A * | 1/1999 | Nepsund ............ B01D 46/0024 55/486 |
| 6,644,797 B2 | 11/2003 | Haines et al. |
| 7,393,372 B2 | 7/2008 | Cassell et al. |
| 7,442,221 B2 | 10/2008 | Ruhland et al. |
| 7,637,976 B2 | 12/2009 | Dirnberger et al. |
| 7,875,173 B1 | 1/2011 | Barnes |
| 8,241,382 B2 | 8/2012 | Pham et al. |
| 2003/0217534 A1 | 11/2003 | Krisko et al. |
| 2005/0060969 A1 | 3/2005 | Volkmann |
| 2008/0010958 A1 | 1/2008 | Fester et al. |
| 2009/0100809 A1* | 4/2009 | Baldwin, Jr. ...... B01D 39/2051 55/318 |
| 2012/0132573 A1 | 5/2012 | Lautzenheiser et al. |
| 2013/0298773 A1 | 11/2013 | Yamagishi |
| 2014/0248178 A1* | 9/2014 | Giovanniello ... F02M 35/02458 422/4 |
| 2014/0260139 A1* | 9/2014 | Merritt ............... B01D 46/0005 55/488 |
| 2015/0052864 A1* | 2/2015 | Jackson ............ B01D 46/2411 55/486 |

* cited by examiner

AIR FILTER ELEMENT ASSEMBLY FOR A MOTOR VEHICLE

This application is a continuation of U.S. patent application Ser. No. 14/498,507 filed on 26 Sep. 2014, the full disclosure of which is incorporated herein by reference.

TECHNICAL FIELD

This document relates generally to the motor vehicle equipment field and, more particularly, to a filter element assembly incorporating a primary filter and an auxiliary filter.

BACKGROUND

An internal combustion engine of a vehicle requires an adequate supply of filtered, fresh air to function properly. Accordingly, air from the atmosphere may be drawn through a particle filter to remove dust and other particulates before the air enters the air intake of the engine. For vehicles operating in temperate climates, a single particle filter may provide many months of adequate air filtration before the filter becomes clogged and a replacement is needed. During severe weather conditions, however, the filter may clog prematurely with ice and snow, thereby restricting air flow into the engine and degrading engine performance. Such severe weather conditions may include, for example, very snowy conditions.

One solution to this problem is to install a specialized grille cover on the vehicle to prevent entry of snow and/or dust into an air filtration system of the vehicle. However, such grille covers are matched specifically to the front-end configuration of the vehicle on which it is installed and may, therefore, be expensive to produce. Furthermore, the vehicle operator may have to install and remove the grille cover repeatedly in response to changing weather conditions, causing dissatisfaction.

It is known to provide air filtration systems adapted to supply sufficient clean air to the intake of the engine when the air filtration system becomes clogged or blocked. Such air filtration systems may comprise a housing that is configured to partition a filter into a main portion and an auxiliary portion, wherein an auxiliary air inlet may be configured to direct air to the auxiliary portion of the filter upon the main portion of the filter becoming blocked.

However, air filtration systems adapted for operation in severe weather conditions may be more expensive and more difficult to service than a standard air filtration system configured for use in cold temperate climates. The present invention seeks to address these issues.

SUMMARY

In accordance with the purposes and benefits described herein, a filter element assembly is provided for a motor vehicle. That filter element assembly comprises a support, a filter body carried on the support and an auxiliary filter. The filter body includes a sidewall around a hollow core. In one possible embodiment the filter body forms an elliptic cylinder. In one possible embodiment the filter body is a pleat-pack filter.

In one possible embodiment, the auxiliary filter is an open cell foam. In one possible embodiment, the auxiliary filter is carried on the support outside of the core. In one possible embodiment, the filter body has a first longitudinal axis and the auxiliary filter has a second longitudinal axis wherein the first longitudinal axis is parallel to and offset from the second longitudinal axis. In one possible embodiment the filter element assembly further includes a sealing ring on the filter body around the axial outlet.

In one possible embodiment, the support includes a base and a cage. The filter body is received on the base around the cage. The support further includes an auxiliary filter mount that receives and holds the auxiliary filter. The mount includes two partitions that divide the filter body into a first section that functions as the primary filter and a second section that is downstream from the auxiliary filter. The partitions are received in valleys between pleats of the pleat-pack filter.

Still further, the auxiliary filter includes a mounting groove and the mount includes a u-shaped wall received in that mounting groove which also could be formed fully enclosed. A fastener received in the two partitions and the mounting groove secures the auxiliary filter to the support.

In the following description, there are shown and described several preferred embodiments of the filter element assembly. As it should be realized, the filter element assembly is capable of other, different embodiments and its several details are capable of modification in various, obvious aspects all without departing from the assembly as set forth and described in the following claims. Accordingly, the drawings and descriptions should be regarded as illustrative in nature and not as restrictive.

BRIEF DESCRIPTION OF THE DRAWING FIGURES

The accompanying drawing figures incorporated herein and forming a part of the specification, illustrate several aspects of the filter element assembly and together with the description serve to explain certain principles thereof. In the drawing.

Reference will now be made in detail to the present preferred embodiments of the filter element assembly, examples of which are illustrated in the accompanying drawing figures.

DETAILED DESCRIPTION

Figure 1:
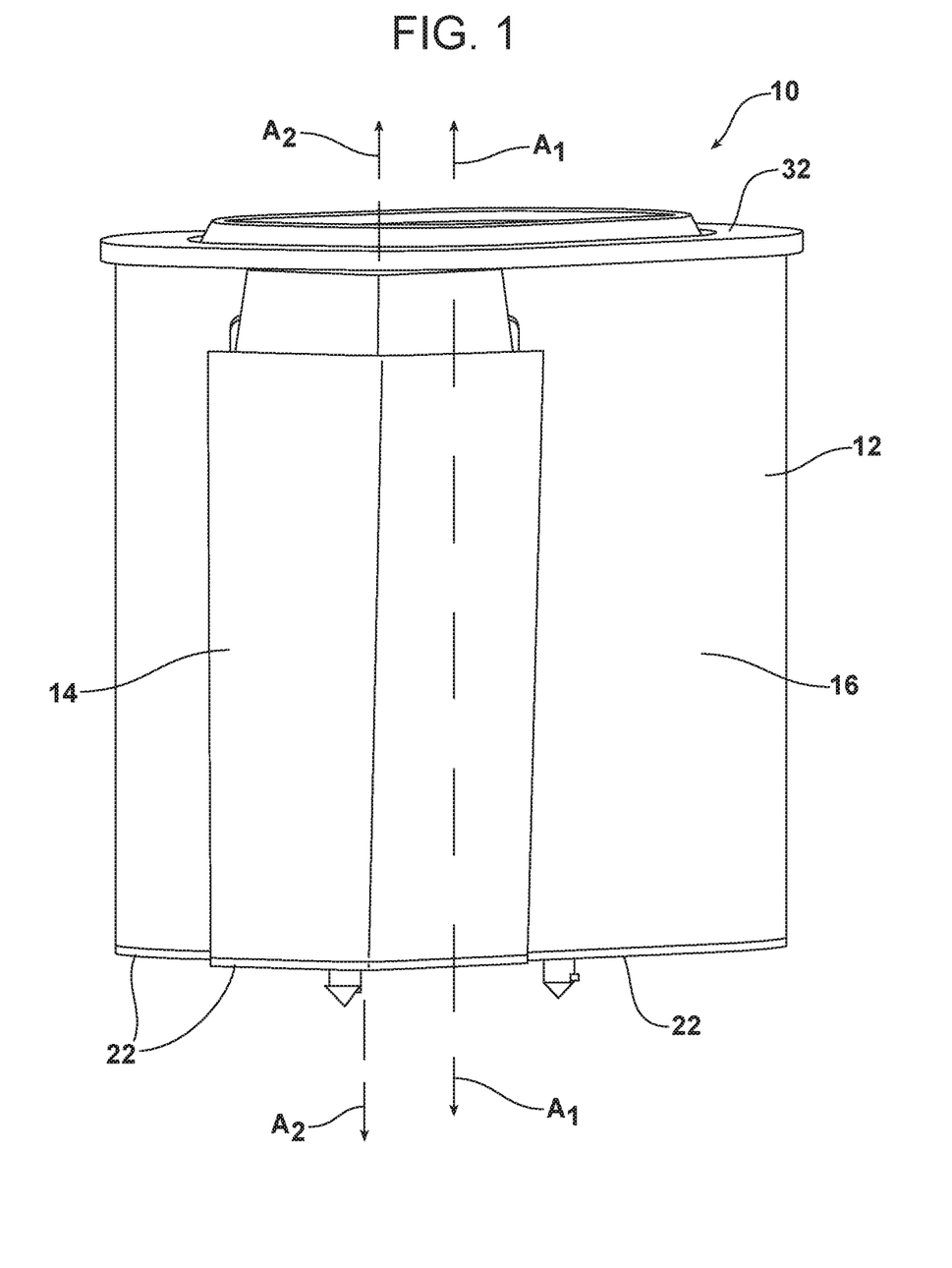
FIG. 1 is a side elevational view of the filter element assembly showing both the primary filter and the auxiliary filter.
Figure 2:
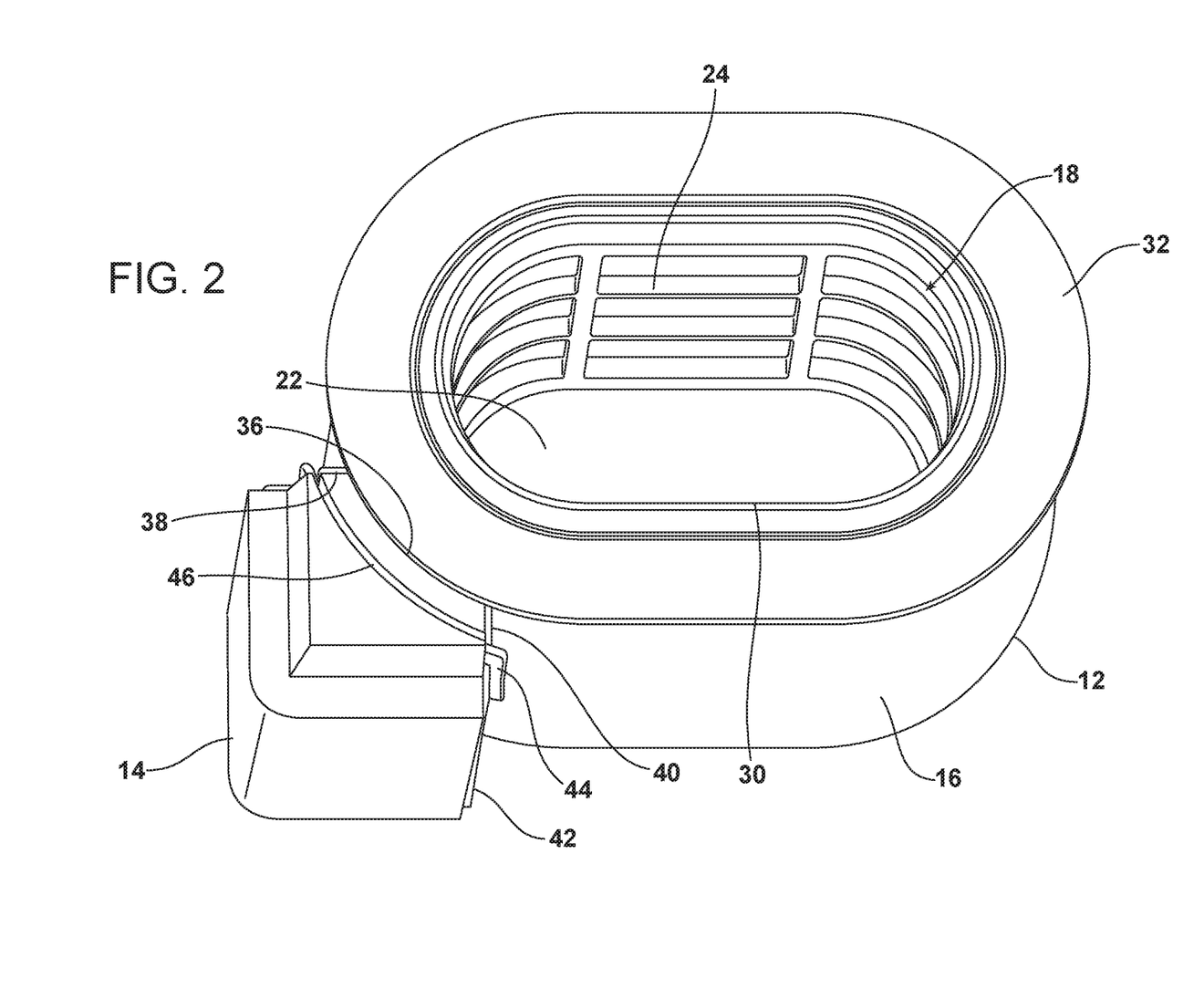
FIG. 2 is a perspective view of the filter element assembly looking downwardly into the core through the axial outlet and showing the support.

Reference is now made to FIGS. 1 and 2 illustrating the filter element assembly 10 which includes a filter body 12 and an auxiliary filter 14. As illustrated in FIGS. 1 and 2, the filter body 12 has a first longitudinal axis $A_1$ while the auxiliary filter 14 has a second longitudinal axis $A_2$. In the illustrated embodiment the first longitudinal axis $A_1$ is parallel to and offset from the second longitudinal axis $A_2$. The filter body 12 comprises a sidewall 16 and a hollow core 18. In the illustrated embodiment, the sidewall 16 is formed by a pleat-pack of pleated filter media of a type known in the art.

Figure 3:
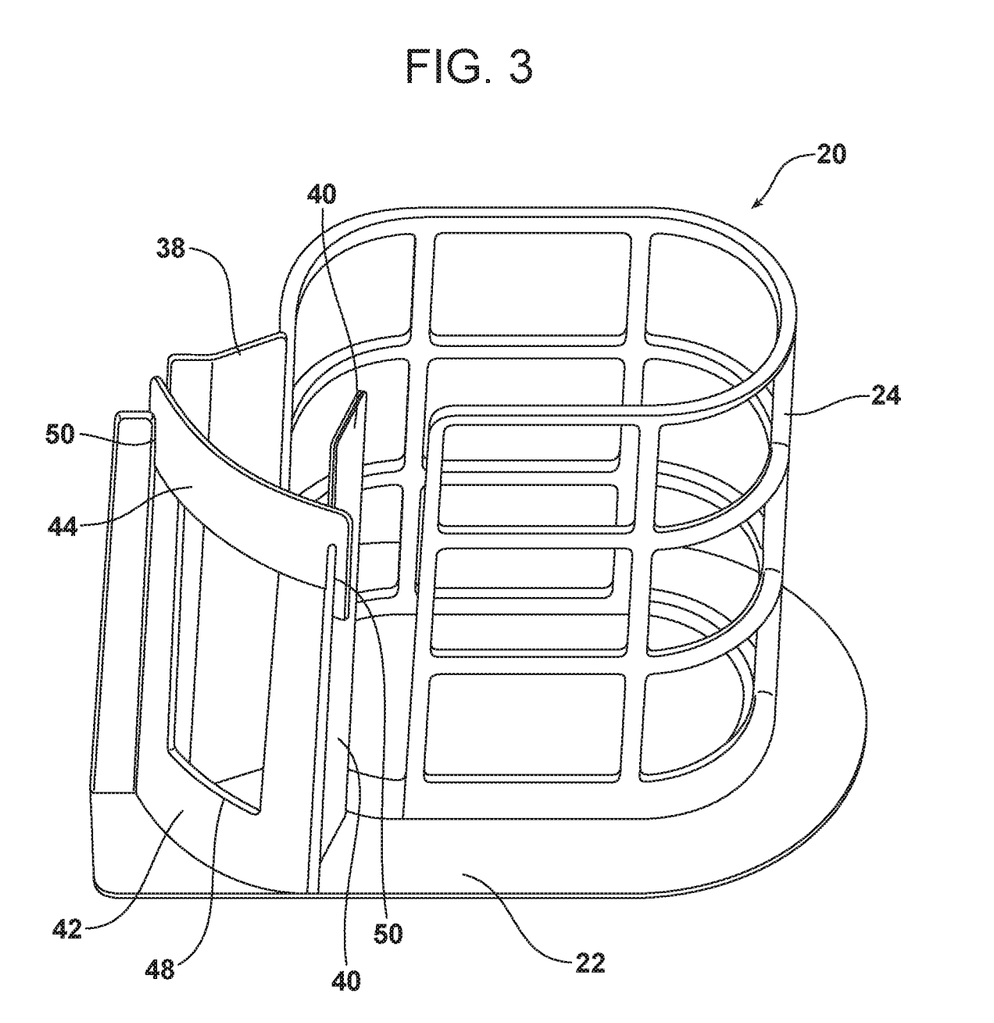
FIG. 3 is a perspective view of the support.

As should be appreciated, both the filter body 12 and auxiliary filter 14 are received and held on a support 20. As best illustrated in FIG. 3, support 20 includes a base 22 and a cage 24 which both may be integrally molded as one or created as separate parts secured together. The filter body 12 is received on the base 22 around the cage 24 so that the cage projects into the hollow core 18 (see FIG. 2). An adhesive may be used to secure the filter body 12 to the base 22. The cage 24 supports the filter 12 and prevents it from collapsing inwardly as air is drawn through the filter body 12 by the motor of the vehicle.

As should be further appreciated, the base 22 closes a first end of the core 18. In contrast, the second end of the core 18 remains open, forming an axial outlet 30 as will be described in greater detail below. A pleat sealing ring 32 of polyurethane or other appropriate material engages the end of the sidewall 16 and extends around the axial outlet 30. In the illustrated embodiment, the filter body 12 is oval in cross-section and forms an elliptic cylinder.

The auxiliary filter 14 is formed from an open cell foam filtering material such as a polyester foam or a reticulated open cell polyether foam. The foam of the auxiliary filter 14 provides a more restricted airflow then the filter media of the filter body 12. In one possible embodiment the foam provides approximately in excess of two inches of mercury restriction.

As should be appreciated, the inner face 36 of the auxiliary filter 14 is arcuate and includes a radius of curvature substantially matching the radius of curvature of the outer wall of the filter body 12. Accordingly, the auxiliary filter 14 may be carried against the filter body 12 outside the core 18. As further shown in FIG. 3, the support 20 includes two partitions 38, 40, an auxiliary filter mount in the form of a curved, u-shaped wall 42 and a curved strip fastener 44. In an alternative embodiment not shown, the fastener 44 may be straight. The auxiliary filter 14 includes a mounting groove 46 (see FIG. 2). The auxiliary filter 14 is positioned over the u-shaped wall 42 so that the wall is received in the groove 46 and the filter extends through the opening 48 in the wall. The fastener 44 is then inserted into the top of the groove 46 and the cooperating slots 50 in the partitions 38, 40 to complete the connection and hold the auxiliary filter 14 in position on the support against the filter body 12. This facilitates assembly of the auxiliary filter foam 14 to the support 20.

Figure 4:
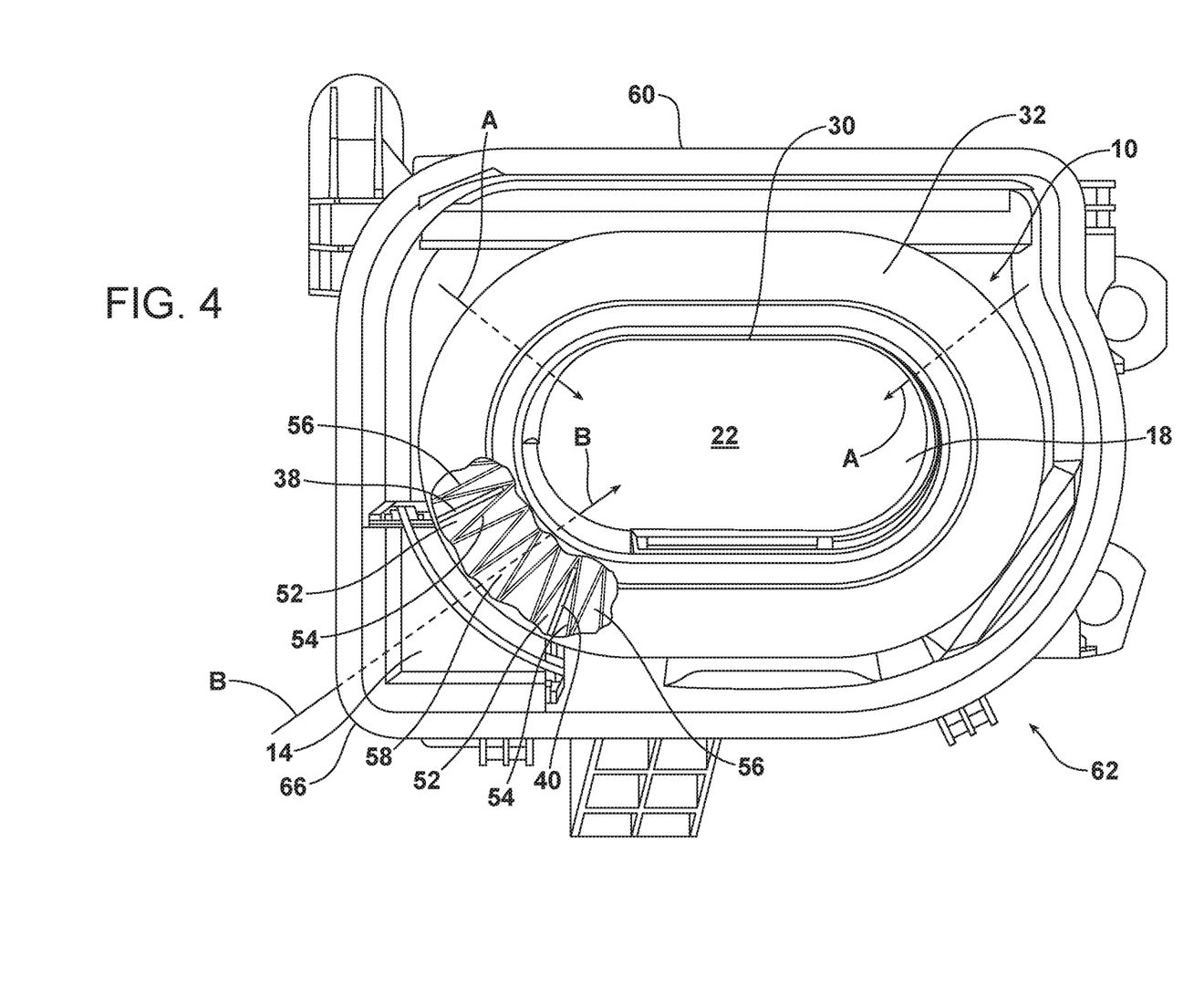
FIG. 4 is a top plan and partially broken-away view illustrating the filter element assembly of FIGS. 1 and 2 positioned in the air cleaner box of the air cleaner assembly of a motor vehicle and showing how the partitions divide the filter body into two sections.

As best illustrated in FIG. 4, the partitions 38, 40 are received in valleys 52 between pleats 54 of the pleat-pack filter body 12. The partitions 38, 40 extend uninterrupted from the base 22 to the sealing ring 32 and effectively function to divide the filter body 12 into a first section 56 that functions as a primary filter and a second section 58 downstream from the auxiliary filter 14. As will be explained in greater detail below, during normal operation, air is drawn into the engine through the first section 56 of the filter body 12 (note action arrows A in FIG. 4). The greater resistance to air flow of the auxiliary filter 14 and the partitions 38, 40 substantially prevent any air flow through the second section 58. However, should the first section 56 become sufficiently clogged so that the air flow resistance of the first section rises above that of the auxiliary filter 14, air will be drawn through the auxiliary filter and the second section 58 (note action arrow B).

Figure 6:
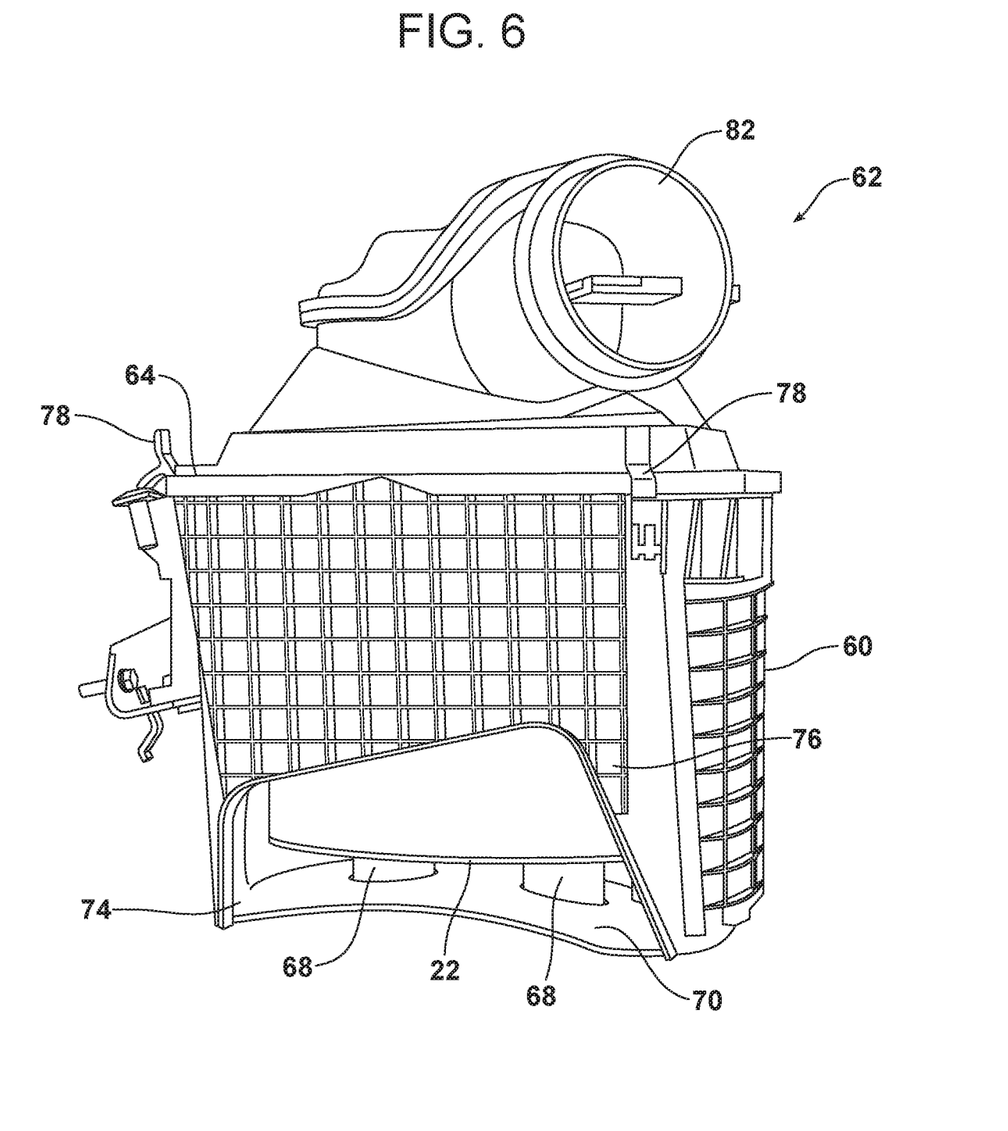
FIG. 6 is a detailed side elevational view illustrating the inlet duct opening in the side of the air cleaner box.

FIG. 4 also illustrates the positioning of the filter element assembly 10 in the air cleaner box 60 of a vehicle air cleaner assembly generally designated by reference numeral 62. More specifically, FIG. 4 illustrates the air cleaner box 60 with the lid 64 removed. As should be appreciated, the filter element assembly 10 may be easily installed within the air cleaner box 60. More specifically, the filter element assembly 10 inclusive of the integrated filter body 12 and auxiliary filter 14 is simply inserted into the air cleaner box 60 with the auxiliary filter 14 oriented into the corner 66 of matching shape so that the outer face of the auxiliary filter 14 fits flush or with designed interference in the corner. As illustrated in FIG. 6, when fully seated in position, the base 22 of the support 20 rests on the projections 68 extending upwardly from the bottom wall 70 of the air cleaner box so as to provide an air passageway between the base and the bottom wall.

Figure 5:
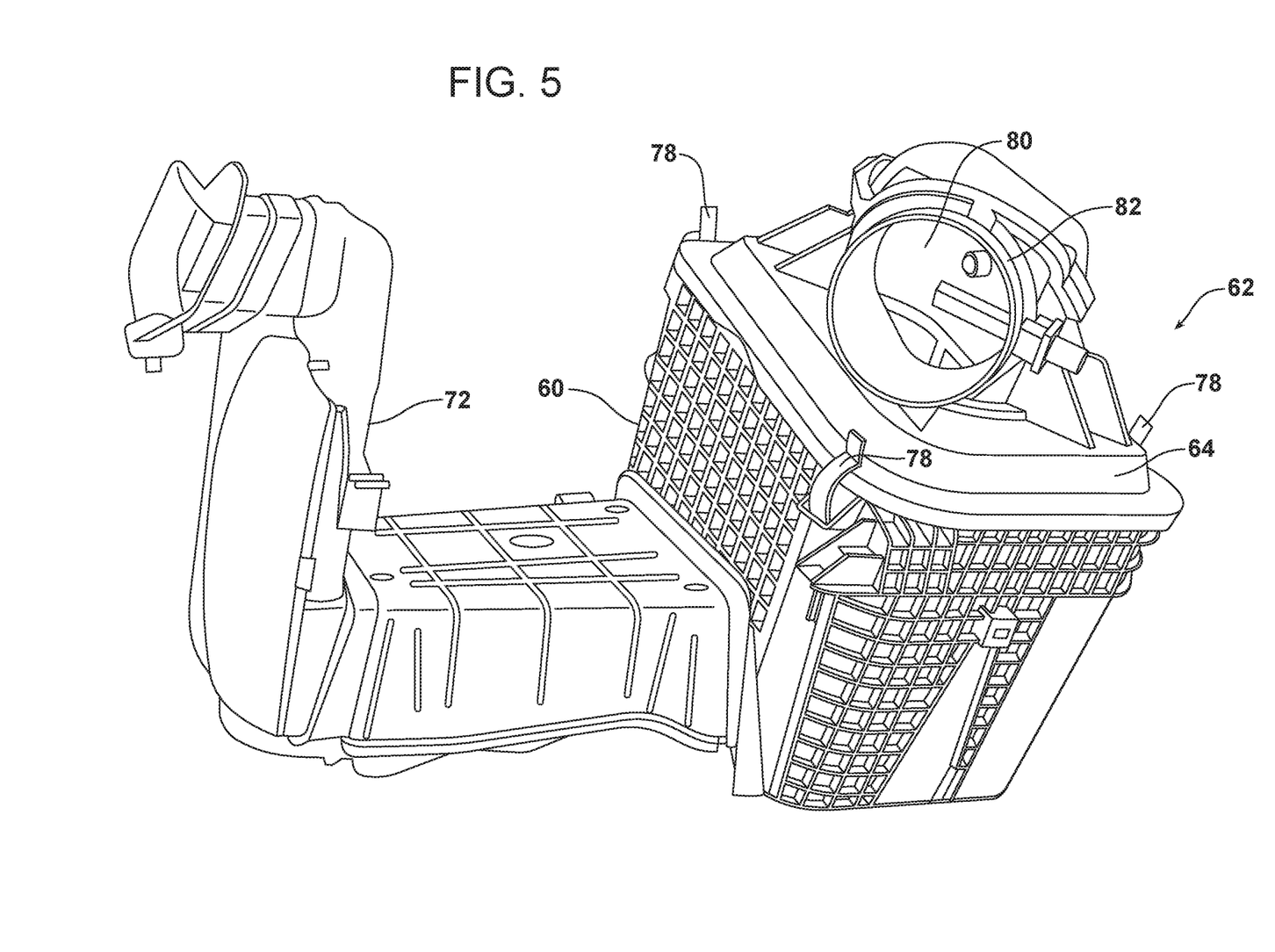
FIG. 5 is a perspective view of the air cleaner assembly illustrating in the inlet duct leading to and the outlet duct leading from the air cleaner box.
Figure 7:
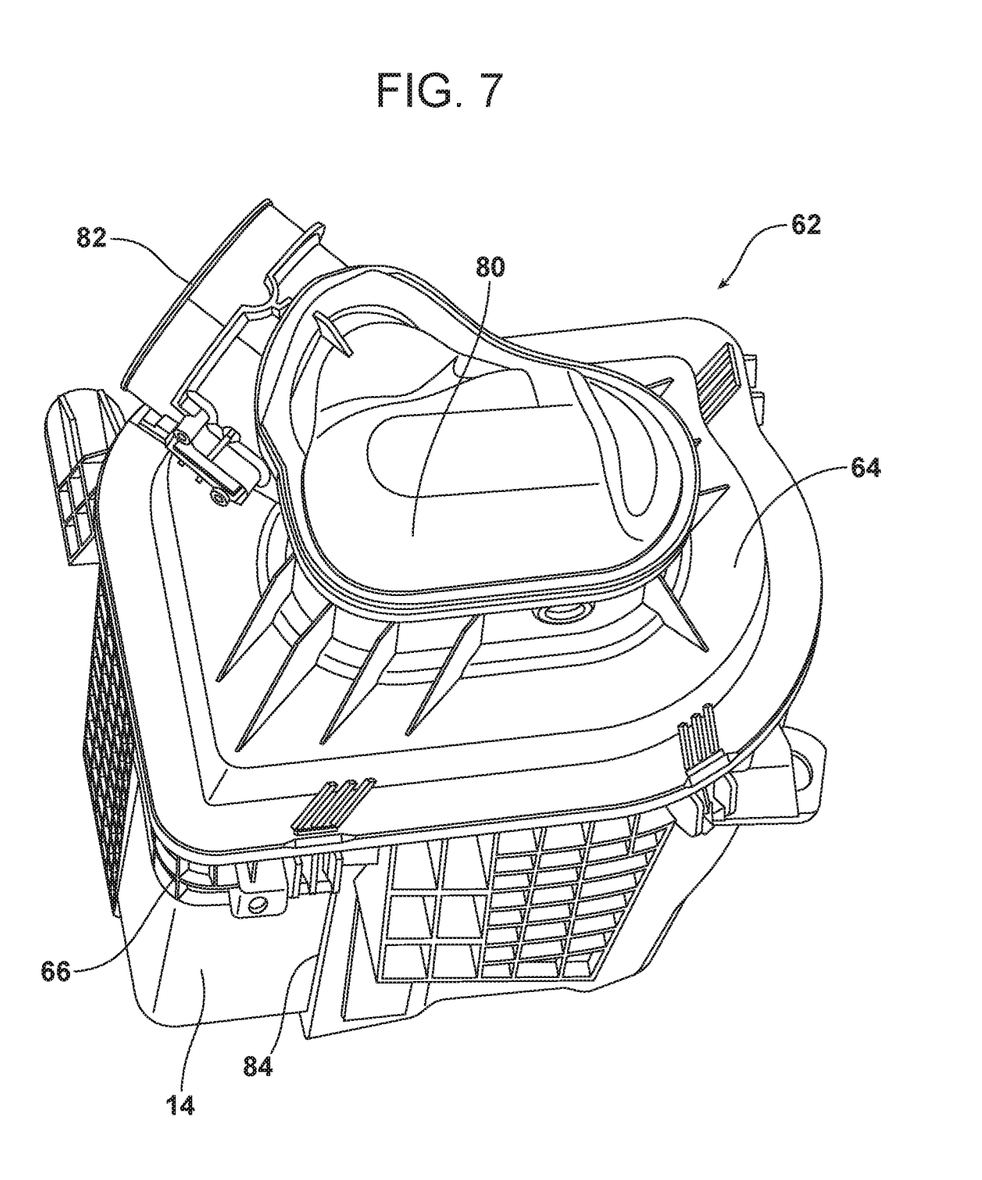
FIG. 7 is a top plan view illustrating the lid closes the top of the air cleaner box and incorporates an outlet plenum and the outlet duct.

As illustrated in FIGS. 5-7, the air cleaner assembly 62 also includes an inlet duct 72 for directing air into the air cleaner box 60 through the opening 74 in the bottom wall 70 and sidewall 76 thereof. Further, the filter element assembly 62 includes the lid 64 that closes the top of the air cleaner box 60 after the filter element assembly 10 has been seated therein. The clips 78 hold the lid 64 in position. As should be further appreciated, the lid 64 includes an outlet plenum 80 and an outlet duct 82. As should be appreciated, the outlet plenum 80 is formed in the lid 64 with an oval shaped opening that is aligned with and matches the axial outlet 30 of the filter element assembly 10. When properly seated and fixed in position by the clips 78, the lid 64 provides a radial and/or axial seal that extends around the axial outlet 30 thereby providing a sealed pathway from the core 18 of the filter element assembly 10 through the outlet plenum 80 to the outlet duct 82.

During normal engine operation, air is drawn into the engine through the inlet duct 72 and the opening 74 into the air cleaner box 60. Air is then drawn through the first section 56 of the filter body 12 which captures dust and particulates. The clean air drawn into the core 18 then passes through the axial outlet 30 into the outlet plenum 80 and then from the outlet duct 82 to the engine of the vehicle. It should be appreciated that during normal operation, the air passes substantially exclusively through first section 56 of the filter body 12 which has far less resistance to airflow than the open cell foam of the auxiliary filter 14. As a result, the second section 58 of the filter body 12 remains clean and clear of any particulates or other material which might degrade its performance.

In the event airflow through the primary filter 12 becomes more restricted than the auxiliary filter 14 such as due to ingestion of ice or snow during inclement weather conditions, air will automatically be drawn from the engine compartment of the vehicle through the auxiliary filter by way of the opening 84 in the side wall of the air cleaner box 60 at the corner 66 (see FIG. 7). As should be appreciated, air in the engine compartment has been warmed by the engine. Accordingly, the auxiliary filter 14 and the second section 58 of the filter body 12 downstream thereof remain free and clear of snow and ice particles. Thus, the airstream being drawn through the auxiliary filter 14 remains available even in inclement weather conditions. That airstream passes from the auxiliary filter 14, to the second filter body section 58 between, the partitions 38, 40 and then through the core 18, the axial outlet 30, the outlet plenum 80 and the outlet duct 82 to the engine. Thus, the engine receives the necessary air to remain running until the vehicle reaches a service area.

In summary, the filter element assembly 10 provides a number of benefits. More specifically, the filter element assembly 10 includes an integrated filter body 12 and auxiliary filter 14 which allows the filter element assembly 10 to be quickly and easily installed in the air cleaner box 60 of the vehicle filter element assembly 62 even out in the field. The filter element assembly 10 is also characterized by inexpensive manufacturing costs.

The foregoing has been presented for purposes of illustration and description. It is not intended to be exhaustive or to limit the embodiments to the precise form disclosed. Obvious modifications and variations are possible in light of the above teachings. For example, in one possible embodiment the second section 58 of the filter body 12 is eliminated and an open passageway is provided downstream of the auxiliary filter 14 between the partitions 38, 40. In another possible embodiment, the leading edge of the partitions 38, 40 extending into the pleat valleys 52 may include a soft edge of polyurethane, rubber or other appropriate material so as to be less abrasive as the pleats 54 vibrate during vehicle operation. All such modifications and variations are within the scope of the appended claims when interpreted in accordance with the breadth to which they are fairly, legally and equitably entitled.

What is claimed:

1. A filter element assembly for a motor vehicle, comprising:
    a support;
    a filter body carried on said support, said filter body including a sidewall; and
    an auxiliary filter having an inner face contoured to match said sidewall of said filter body whereby said auxiliary filter is carried against said filter body.

2. The filter element assembly of claim 1, wherein said filter body is formed from an open cell foam filtering material.

3. The filter element assembly of claim 2, wherein said open cell foam filtering material is selected from a group of materials consisting of a polyester foam and a reticulated open cell polyether foam.

4. The filter element assembly of claim 3, wherein said filter body provides approximately in excess of two inches of mercury restriction.

5. The filter element assembly of claim 4, wherein said inner face is arcuate.

6. The filter element assembly of claim 5, wherein said inner face has a first radius of curvature substantially matching a second radius of curvature of said filter body.

7. The filter element assembly of claim 1, wherein said filter body provides approximately in excess of two inches of mercury restriction.

8. The filter element assembly of claim 1, wherein said inner face is arcuate.

9. The filter element assembly of claim 1, wherein said inner face has a first radius of curvature substantially matching a second radius of curvature of said filter body.

10. The filter element assembly of claim 1, wherein said filter body is a pleat-pack filter.

11. The filter element assembly of claim 10, wherein said sidewall extends around a hollow core.

\* \* \* \* \*